United States Patent [19]

Volmer et al.

[11] Patent Number: 5,147,935
[45] Date of Patent: Sep. 15, 1992

[54] STABILIZED COMPOSITIONS BASED ON POLYAMIDES AND OBJECTS MANUFACTURED FROM THESE COMPOSITIONS

[75] Inventors: Sophie Volmer; Dominique Debecker, both of Brussels, Belgium

[73] Assignee: Solvay S.A., Brussels, Belgium

[21] Appl. No.: 658,312

[22] Filed: Feb. 20, 1991

[30] Foreign Application Priority Data

Feb. 23, 1990 [BE] Belgium .............................. 09000211

[51] Int. Cl.$^5$ ......................... C08K 5/51; C08K 3/20
[52] U.S. Cl. .................................. 524/152; 524/222; 524/242
[58] Field of Search ........................ 524/152, 222, 242

[56] References Cited

U.S. PATENT DOCUMENTS 3,677,965 7/1972 Dexter et al. ...................... 524/222
3,787,355 1/1974 Linhart et al. ...................... 524/222
4,119,603 10/1978 Holub et al. ...................... 524/222

FOREIGN PATENT DOCUMENTS 2040089 3/1970 France .
2340343 2/1977 France .

Primary Examiner—Kriellion S. Morgan
Attorney, Agent, or Firm—Spencer, Frank & Schneider

[57] ABSTRACT

Stabilized compositions based on polyamides containing
 (a) a symmetrical triaryl phosphite,
 (b) an amide derived from an alkylhydroxyphenylalkanoic acid, and
 (c) an alkylhydroxyphenylalkanoylhydrazine.

These compositions, which are highly resistant to thermooxidative degradation, are suitable for the manufacture of all kinds of shaped objects.

10 Claims, No Drawings

STABILIZED COMPOSITIONS BASED ON POLYAMIDES AND OBJECTS MANUFACTURED FROM THESE COMPOSITIONS

The present invention relates to stabilised compositions based on polyamides. It relates more particularly to compositions based on semiaromatic polyamides which are stabilised against thermal aging.

Polyamides are thermoplastic polymers which are valued for their mechanical and dielectric properties, for their chemical inertness and for their resistance to elevated temperatures. In most cases reinforced with glass fibres, they can be converted, especially by injection moulding, into objects which can be employed under severe conditions.

To stabilise polyamides against thermooxidative degradation it has already been proposed to incorporate therein symmetrical triaryl phosphites, especially tri(2,4-di-tert-butylphenyl) phosphite in combination with phenolic antioxidants (Ciba-Geigy patent BE-A-851,082).

This stabilising composition has not been found wholly satisfactory, insofar as it does not prevent the thermal aging of moulded objects in the long run, entailing a considerable deterioration in their surface appearance.

The invention is aimed at overcoming this disadvantage and consequently providing compositions based on polyamides which are more resistant to thermooxidative degradation.

To this end, the present invention concerns stabilised compositions based on polyamides (PA) containing:
(a) a symmetrical triaryl phosphite,
(b) an amide derived from an alkylhydroxyphenylalkanoic acid, and additionally containing:
(c) an alkylhydroxyphenylalkanoylhydrazine The polyamides (called PA hereinafter) present in the stabilised compositions according to the invention may be chosen from PA derived from aliphatic, alicyclic and aromatic amines, on the one hand, and from aliphatic, alicyclic and aromatic dicarboxylic acids, on the other hand.

Examples of amines which can be employed are hexamethylenediamine, decamethylenediamine, dodecamethylenediamine, 2,2,4- and 2,4,4-trimethylhexamethylenediamines, 1,3- and 1,4-bis(aminomethyl)cyclohexanes, bis(p-aminocyclohexylmethane), m-xylylenediamine and p-xylylenediamine.

Examples of acids which can be employed are adipic, suberic, sebacic, glutaric, azelaic, cyclohexanedicarboxylic, isophthalic and terephthalic acids.

The PA involved may also be ones derived from acyl halides or from dialkyl esters of these acids, from aminocarboxylic acids such as 6-aminocaproic, 6-aminocaprylic, 6-aminolauric, 11-aminoundecanoic and 12-aminododecanoic acids, for example, or else from lactams derived from these acids, such as ε-caprolactam and ω-dodecalactam, for example.

These PA can also be derived from more than one amine or from more than one acid; mixtures of different PAs can also be employed.

Examples of particular PAs which can be employed are polyhexamethylene adipamide (nylon 66), polyhexamethylene sebacamide (nylon 610), polycapramide (nylon 6) and polydodecanamide (nylon 12).

The PA which are preferred because they offer a number of advantages (low water uptake giving them a good dimensional stability, high rigidity, good creep resistance, good dielectric properties, etc.) are, however, the semiaromatic PA obtained by polycondensation of xylylenediamines with α,ω-dicarboxylic linear aliphatic acids containing from 6 to 12 carbon atoms and most particularly the PA obtained by the reaction of condensation of m-xylylenediamine with adipic acid (called PAMXD6 hereinafter).

The symmetrical triaryl phosphite (a) employed in the compositions according to the invention is an organic phosphite containing three aryl radicals with identical substituents. These phosphites can be denoted by the formula

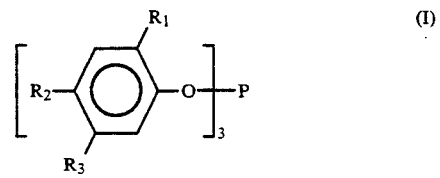

in which
$R_1$ denotes a tert-butyl, 1,1-dimethylpropyl, cyclohexyl or phenyl radical,
$R_2$ and $R_3$ denote, respectively, one a hydrogen atom and the other a hydrogen atom or a methyl, tert-butyl, 1,1-dimethylpropyl, cyclohexyl or phenyl radical.

In formula (I) above, $R_1$ is preferably a tertbutyl radical and $R_2$ and $R_3$ are preferably, respectively, one a hydrogen atom and the other a hydrogen atom or a methyl radical or a tert-butyl radical.

By way of examples of phosphites corresponding to formula (I) there may be mentioned:
tri(2,5-di-tert-butylphenyl)phosphite
tri(2-tert-butylphenyl)phosphite
tri(2-phenylphenyl)phosphite
tri[2-(1,1-dimethylpropyl)phenyl]phosphite
tri[2,4-di(1,1-dimethylpropyl)phenyl]phosphite
tri(2-cyclohexylphenyl)phosphite
tri(2-tert-butyl-4-phenylphenyl)phosphite
tri(2-tert-butyl-4-methylphenyl)phosphite
tri(2,4-di-tert-amylphenyl)phosphite and
tri(2,4-di-tert-butylphenyl)phosphite.

These phosphites can be prepared by known processes described in patent BE-A-851,082, for example by reaction of the corresponding phenol with phosphorus trichloride in the presence of an organic base or by reaction with triphenyl phosphite in the presence of a basic catalyst.

The stabilised compositions according to the invention also comprise an amide (b) derived from alkylhydroxy-phenylalkanoic acids.

These amides, originating from the abovementioned acids and from polyamines, can be denoted by the formula

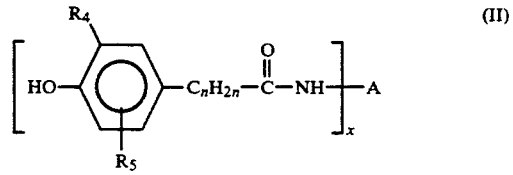

in which
$R_4$ denotes an alkyl radical with a straight or branched chain containing from 1 to 12 carbon atoms, for example a methyl, ethyl, propyl, butyl, tert-butyl, hexyl, octyl or decyl radical, R₅ denotes a hydrogen atom or an alkyl radical corresponding to the same definition as R₄, n is a number from 0 to 6, x is a number from 2 to 4, A is an aliphatic or cyclic, straight or branched polyvalent hydrocarbon chain containing from 1 to 30 carbon atoms and whose value is equal to x.

By way of examples of amides corresponding to formula (II) there may be mentioned those derived from the abovementioned acids and from polyamines such as ethylenediamine, 1,3-diaminopropane, 1,6-diaminohexane, 1,10-diaminodecane, 1,1-di(aminomethyl)ethylamine,tetra(aminomethyl)methane, 1,4-diaminomethylcyclohexane and 1,4-diaminocyclohexane.

Among the above amides (b) the amides of 3-(3,5-di-tert-butyl-4-hydroxyphenyl)propionic acid are preferred.

By way of examples of amides corresponding to the formula (II) there may be mentioned:

1,6-bis[3-(3,5-di-tert-butyl-4-hydroxyphenyl)propionamido]hexane, 1,6-bis[3-(3-methyl-4-hydroxy-5-tert-butylphenyl)propionamido]hexane, 1,6-bis[3-(3,5-dimethyl-4-hydroxyphenyl)propionamido]hexane, 1,6-bis[alpha-(3,5-di-tert-butyl-4-hydroxyphenyl)isobutyramido]hexane, 1,6-bis(3,5-di-tert-butyl-4-hydroxyphenylacetamido)hexane, 1,6-bis[2-(3,5-di-tert-butyl-4-hydroxyphenyl)propionamido]hexane, 1,2-bis[3-(3,5-di-tert-butyl-4-hydroxyphenyl)propionamido]ethane, 1,4-bis[3-(3,5-di-tert-butyl-4-hydroxyphenyl)propionamidomethyl]cyclohexane, 1,4-bis[3-(3,5-di-tert-butyl-4-hydroxyphenyl)propionamide]-cyclohexane, 1,2-bis[3-(3,5-di-tert-butyl-4-hydroxyphenyl)propionamido]cyclohexane, and tetrakis[3-(3,5-di-tert-butyl-4-hydroxyphenyl)propionamidomethyl]methane.

The amides (b) can be prepared by known amidation processes mentioned in patent BE-A-726,092 (J. R. Geigy S. A.), for example by heating the abovementioned acids or one of their halides or alkyl esters with a polyamine in an inert organic solvent.

The stabilised compositions according to the invention also comprise a hydrazine (c) which is an alkylhydroxyphenylalkanoylhydrazine.

These hydrazines (c) can be denoted by the formula

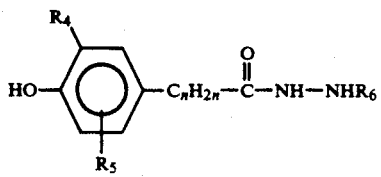
(III)

in which

R₄, R₅ and n have the meaning shown above in relation to amides (b) and R₆ denotes a hydrogen atom, an alkanoyl radical containing from 2 to 18 carbon atoms or a radical of formula

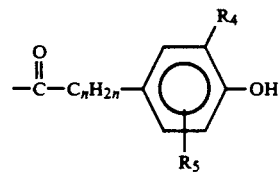

in which R₄, R₅ and n have the meaning shown above.

By way of examples of hydrazines (c), there may be mentioned β-(3,5-di-tert-butyl-4-hydroxyphenyl)propionylhydrazine, N-stearoyl-N'-[β-(3,5-di-tert-butyl-4-hydroxyphenyl)propionyl]hydrazine, N-[β-(3-ethyl-5-tert-butyl-4-hydroxyphenyl)propionyl]-N'-[β-(3,5-di-tert-butyl-4-hydroxyphenyl)propionyl]hydrazine, N-[β-(3,5-di-tert-butyl-4-hydroxyphenyl)propionyl]-N'-(3,5-di-tert-butyl-4-hydroxybenzoyl)hydrazine, N-stearoyl-N'-[β-(3,5-dicyclohexyl-4-hydroxyphenyl)propionyl]hydrazine, N-octanoyl-N'-[β-(3-methyl-5-cyclododecyl-4-hydroxyphenyl)propionyl]hydrazine and N,N'-bis-β-(3,5-di-tertbutyl-4-hydroxyphenyl)propionylhydrazine.

The hydrazines (c) can be prepared by known processes mentioned in patent BE-A-748,097 (J. R. Geigy S. A.), for example by reaction between hydrazine and an ester of an alkylhydroxy-phenylalkanoic acid or of the corresponding acid halide.

The stabilising mixture comprising the phosphite (a), the amide (b) and the hydrazine (c) is incorporated in the compositions according to the invention in a concentration which is generally between 0.01 and 5% by weight relative to the weight of PA which they contain. This mixture is preferably incorporated in a concentration of between 0.05 and 1% relative to the weight of PA, most particularly in a concentration of between 0.1 and 0.5%. The respective weight ratios between the phosphite (a), the amide (b) and the hydrazine (c) in the stabilising mixture are generally such that (a):(b) : (c) =(1):(10 to 0.1):(5 to 0.1), preferably (1):(8 to 1):(4 to 1). Typical ratios between the respective constituents of the stabilising mixture are (1):(5 to 1):(2).

Besides the PA and the stabilising mixture defined above, the compositions according to the invention may also incorporate, conventionally and in the usual quantities, one or more of the known ingredients and additives which follow.

It is possible to incorporate fibrous reinforcing agents such as, for example, glass fibres, carbon fibres, metal carbide or boride fibres, whiskers, and the like. A preferred fibrous reinforcing agent consists of glass fibres, optionally treated with conventional coupling agents. Silanes may be mentioned as such agents. Examples of glass fibres which can be employed are the glass fibres marketed under the names Vetrotex P338, P327 and 5145; Silenka 8087 and 8045 and OCF CS R23DX1 and R17BX1.

When a fibrous reinforcing agent is incorporated in the compositions according to the invention, it may constitute from 10 to 80% of the total weight thereof, and preferably from 20 to 70% by weight. The best results are recorded when the fibrous reinforcing agent constitutes from 35 to 65% of the total weight of the compositions.

It is possible to incorporate other known light, heat and oxidation stabilisers, inorganic fillers, flame-retardants, colorants, pigments, lubricants, antistatic agents, demoulding agents and processing aids.

It is also possible to incorporate a conventional nucleating agent for the PA. constituent of the compositions according to the invention, such as talc and alkali-metal or alkaline-earth metal phosphinates. When the PA present in the compositions is PAMXD6, a well-known nucleating agent is polyhexamethylene adipamide (nylon 66).

Polymers other than PA can also be incorporated in a known manner in the compositions according to the invention. These polymers are generally chosen from polyesters and polyolefins. A typical polyester which may be mentioned is poly(ethylene terephthalate). Polymers of ethylene and of propylene may be mentioned as polyolefins, most particularly the propylene polymers in which at least a proportion is modified with a polar monomer such as maleic anhydride.

The stabilised compositions according to the invention can be prepared by any of the known techniques which ensure a thorough and homogeneous mixing of their constituents Thus, the PA, the stabilising mixture defined above and the optional other ingredients and additives may be mixed dry and then melt-blended. To produce the dry mix, any mixer whatsoever may be employed, such as ribbon mixers, drum mixers, the fast mixers marketed by Henschel, Loedige, Dyosna, and others. To do the melt blending it is possible to work equally well in mixers of the external type or in mixers of the internal type, such as those marketed by Troester, Banbury, and others. For technical and economic reasons, however, it is preferred to work in mixers of the internal type and more particularly in extruders, which constitute a special class of internal mixers.

The stabilised compositions according to the invention are suited to processing using all the conventional methods of converting plastics, and more particularly by injection moulding. These compositions are suitable for the manufacture of all kinds of shaped objects and more particularly of injection-moulded articles.

The stabilised compositions according to the invention exhibit an exceptional thermal aging resistance, which allows the objects manufactured from them to be employed continuously at high temperature for very long periods, which makes them particularly suited for replacing light alloys especially in the motor vehicle and aircraft industries.

The invention is illustrated by the examples below.

EXAMPLE 1

A stabilised composition is preferred by dry-mixing the following constituents:

440 parts by weight of a PAMXD6,
500 parts by weight of glass fibres marketed by Vetrotex under the name P327,
49 parts by weight of nylon 66 (ICI product Maranyl A-100),
10 parts by weight of talc,
5 parts by weight of 1,6-bis[3-(3,5-di-tert-butyl-4-hydroxyphenyl)propionamido]hexane (amide (b)) marketed by Ciba-Geigy under the name Irganox 1098,
2 parts by weight of N,N'-bis[3-(3,5-di-tert-butyl-4-hydroxyphenyl)propionyl]hydrazine (hydrazine (c)) marketed under the name Irganox MD 1024,
1 part by weight of tri(2,4-di-tert-butylphenyl) phosphite (phosphite (a)) marketed by Ciba-Geigy under the name IRGAFOS 168, and
1 part by weight of barium stearate.

This mixture is granulated in a single-screw extruder and the granules are converted by injection moulding into test specimens which were subjected to an aging test in a ventilated oven at 150° C. for various times.

The thermooxidative degradation resistance of the test specimens injection-moulded from the above composition was assessed by measuring their flexural strength according to ASTM standard D790-80 and also from the roughness of the aged test specimens, measured according to ISO standard 4288 and expressed according to ISO standard 468.

The results of these measurements are collated in Table I below.

TABLE I

| | Aging period (hours) | | | |
|---|---|---|---|---|
| | 0 | 500 | 1000 | 2000 |
| Breaking stress (MPa) | 395 | 294 | 297 | 259 |
| Arithmetic roughness (mμ) (ISO standard 468) | 0.17 | 0.22 | 0.48 | 0.94 |

EXAMPLE 2

Example 1 is reproduced, except that 1 part by weight of amide (b) is employed to prepare the stabilised composition.

The results obtained are collated in Table II below.

EXAMPLES 1R TO 3R

These examples are given by way of comparison.

To produce Example 1R, Example 1 is reproduced, except that the constituents (a), (b) and (c) are not incorporated in the composition.

To produce Example 2R, Example 2 is reproduced, except that the hydrazine (c) is not incorporated in the composition.

To produce Example 3R, Example 2 is reproduced, except that the phosphite (a) is not incorporated in the composition.

The results obtained are collated in Table II below.

TABLE II

| | 0 | 500 | 1000 | 2000 |
|---|---|---|---|---|
| Example 2 | | | | |
| Breaking stress (B.S.) (MPa) | 391 | 295 | 287 | 238 |
| Arithmetic roughness (Ra) (mμ) | 0.14 | 0.47 | 1.50 | 2.46 |
| Example 1R | | | | |
| B.S. (MPa) | 365 | 316 | 276 | 174 |
| Ra (mμ) | 0.30 | 1.84 | 3.62 | 5.34 |
| Example 2R | | | | |
| B.S. (MPa) | 351 | 258 | 207 | 150 |
| Ra (mμ) | 0.43 | 1.76 | 3.23 | 6.58 |
| Example 3R | | | | |
| B.S. (MPa) | 372 | 296 | 286 | |
| Ra (mμ) | 0.44 | 0.45 | 1.05 | 4.02 |

These results clearly show the surprising improvement in the long-term resistance to thermooxidative degradation of the compositions according to the invention (which is reflected by the marketly higher values of the breaking stress and by the finer surface appearance (value of Ra)).

We claim:

1. A stabilised polyamide composition, containing
   (a) a symmetrical triaryl phosphite, (b) an alkylhydroxyphenylalkanoic acid amide and;
(c) an alkylhydroxyphenylalkanoylhydrazine.

2. The stabilised composition according to claim 1, wherein the polyamide comprises a product obtained by polycondensation of xylylenediamines with α,ω-dicarboxylic linear aliphatic acids containing from 6 to 12 carbon atoms.

3. The stabilised composition according to claim 1, wherein the phosphite
(a) corresponds to the formula

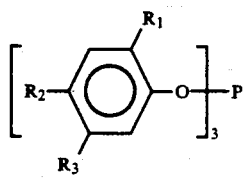

in which
R$_1$ denotes a tert-butyl, 1,1-dimethylpropyl, cyclohexyl or phenyl radical,
R$_2$ and R$_3$ denote, respectively, one a hydrogen atom and the other a hydrogen atom or a methyl, tert-butyl, 1,1-dimethylpropyl, cyclohexyl or phenyl radical.

4. The stabilised composition according to claim 3, wherein the phosphite (a) is tri(2,4-di-ter-butylphenyl) phosphite.

5. The stabilised composition according to claim 1, wherein the amide (b) corresponds to the formula

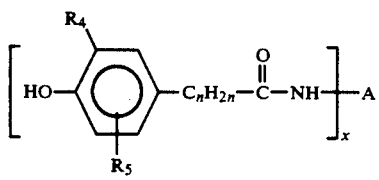

in which
R$_4$ denotes an alkyl radical with a straight or branched chain containing from 1 to 12 carbon atoms, for example a methyl, ethyl, propyl, butyl, tert-butyl, hexyl, octyl or decyl radical, R$_5$ denotes a hydrogen atom or an alkyl radical corresponding to the same definition as R$_4$,
n is a number from 0 to 6,
x is a number from 2 to 4,
A is an aliphatic or cyclic, straight or branched polyvalent hydrocarbon chain containing from 1 to 30 carbon atoms and whose value is equal to x.

6. The stabilised composition according to claim 5, wherein the amide (b) is 1,6-bis[3-(3,5-di-tert-butyl-4-hydroxyphenyl)propionamido]hexane.

7. The stabilised composition according to claim 1, wherein the hydrazine (c) corresponds to the formula

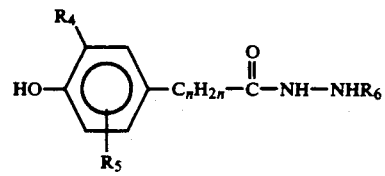

in which
R$_4$, R$_5$ an n having the meaning shown above in relation to the amides (b) and R$_6$ denotes a hydrogen atoms, an alkanoyl radical containing from 2 to 18 carbon atoms or a radical of formula

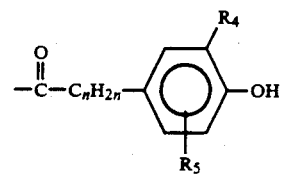

in which R$_4$, R$_5$ and n have the meaning shown above.

8. The stabilised composition according to claim 7, wherein the hydrazine (c) is N,N'-bis[β-3,5-di-ter-butyl-4-hydroxyphenyl)propionyl]hydrazine.

9. The stabilised composition according to claim 1, characterized in that they additionally contain a fibrous reinforcing agent.

10. An object manufactured from a composition according to claim 1.

* * * * *